(12) United States Patent
Matsufuji et al.

(10) Patent No.: US 6,530,290 B2
(45) Date of Patent: Mar. 11, 2003

(54) SPEED CHANGE CONTROL DEVICE FOR TRACTORS

(75) Inventors: Mizuya Matsufuji, Sanda (JP); Takumi Fujita, Itami (JP)

(73) Assignee: Kanzaki Kokyukoki Mfg. Co., Ltd., Amagasaki (JP)

( * ) Notice: Subject to any disclaimer, the term of this patent is extended or adjusted under 35 U.S.C. 154(b) by 0 days.

(21) Appl. No.: 09/793,327

(22) Filed: Feb. 26, 2001

(65) Prior Publication Data

US 2001/0027690 A1 Oct. 11, 2001

(30) Foreign Application Priority Data

Apr. 10, 2000 (JP) .................................. 2000-108577

(51) Int. Cl.[7] ............................................. F16H 59/00
(52) U.S. Cl. ........................................ 74/335; 74/473.2
(58) Field of Search ...................... 74/745, 335, 473.2

(56) References Cited

U.S. PATENT DOCUMENTS 2,748,910 A * 6/1956 Klecker ....................... 74/335
3,955,437 A * 5/1976 Heintz ...................... 74/473.2
5,269,195 A   12/1993 Kitagawara

* cited by examiner

Primary Examiner—Dirk Wright

(57) ABSTRACT

A slidable and rotatable first control shaft (61) and a slidable and rotatable second control shaft (67) for respectively shifting main and auxiliary speed change mechanisms (26, 29) project outwardly to one side of a vehicle housing (2) and are connected respectively to a main change lever (74) and an auxiliary change lever (75) which are pivotally supported by a support member (70) fixedly provided at one side of the vehicle housing. Preferably, the main change lever is disposed at a location where an operator on a seat (76) can operate the lever easily whereas the auxiliary change lever is disposed at a location where the operator is hard to operate the lever. The support member is preferably composed of a cover member which surrounds the control shafts, lower portions of the change levers, and connecting members (80, 87) therebetween. An opening (70b) provided to the cover member for assembling the connecting members is closed by a closure member (70c).

6 Claims, 8 Drawing Sheets

SPEED CHANGE CONTROL DEVICE FOR TRACTORS

FIELD OF THE INVENTION

This invention relates to a speed change control device for shifting a main speed change mechanism and an auxiliary speed change mechanism which are disposed within a vehicle housing of a tractor.

BACKGROUND OF THE INVENTION

There is well known from, for example, U.S. Pat. No. 5,269,195 (which corresponds to JP, U No. 5-35527) a speed change control device in which control shafts for shifting respectively a main speed change mechanism and an auxiliary speed change mechanism for a tractor are slidably and rotatably supported within a vehicle housing in a direction across the housing so as to extend outwardly of the vehicle housing and are connected respectively to a main change lever and to an auxiliary change lever such that each of the control shafts is selectively displaced slidingly and rotationally by a selective pivotal operation of each change lever.

According to the prior art, the control shaft for shifting the main speed change mechanism extends outwardly to one side of the vehicle housing and is connected to the main change lever disposed at one side of the housing whereas the control shaft for shifting the auxiliary speed change mechanism extends outwardly to the other side of the vehicle housing and is connected to the auxiliary change lever disposed at the other side of the housing. Thus, the change levers, control shafts and connecting members therebetween are arranged at one and the other sides of the vehicle housing so that an operator is hindered from riding on and getting off a seat on the vehicle housing. Further, a support member for supporting the main change lever and another support member for supporting the auxiliary change lever are separately provided, so that costs for manufacturing and assembling such support members are increased so much.

Accordingly, a main object of the present invention is to provide a novel speed change control device in which main and auxiliary change levers are disposed only at one side of a vehicle housing such that a support member for both of the change levers is made common, whereby the drawbacks of the speed change control device according to the prior art are eliminated.

SUMMARY OF THE INVENTION

The present invention relates to a speed change control device for a tractor having a main speed change mechanism (26) and an auxiliary speed change mechanism (29) which are disposed in a vehicle housing (2). The speed change control device according to the present invention is characterized in:

that a slidable and rotatable first control shaft (61) for shifting the main speed change mechanism (26) and a slidable and rotatable second control shaft (67) for shifting the auxiliary speed change mechanism (29) are arranged such that the first and second control shafts extend laterally within the vehicle housing (2) and project outwardly to one side of the vehicle housing; and that a support member (70) for pivotally supporting a main change lever (74) and an auxiliary change lever (75) is fixedly provided at one side of the vehicle housing (2), the first and second control shafts (61, 67) being connected respectively to the main and auxiliary change levers such that each of the first and second control shafts is selectively displaced slidingly and rotationally by a selective pivotal operation of each of the main and auxiliary change levers.

Because the first control shaft (61) for shifting the main speed change mechanism and the second control shaft (67) for shifting the auxiliary speed change mechanism project outwardly to one side of the vehicle housing (2) and are connected respectively to the main change lever (74) and auxiliary change lever (75) which are pivotally supported by a common support member (70) fixedly provided at one side of the vehicle housing, both of the main and auxiliary chane levers are disposed only at one side of the vehicle housing. Thus, there exists no change lever at the other side of vehicle housing so that an operator is not hindered from riding on and getting off a seat by any one of the change levers. Because the support member (70) is made common to both of the change levers, costs for manufacting and securing the same are greatly reduced as compared to the prior art structure.

For avoiding an error in operating the change levers, it is preferred that the main change lever (74) and the auxiliary change lever (75) are disposed at one side of a seat (76) on the vehicle housing (2) such that the main change lever is located outwardly of the auxiliary change lever and such that a grip portion (74a) of the main change lever is located at a higher level than a grip portion (75a) of the auxiliary change lever. Speed change operation of the main speed change mechanism is constantly made during the running of vehicle, whereas the auxiliary speed change mechanism is usually used such that a suitable change ratio thereof is preset prior to the running of vehicle in response to the running condition. According to the above-referenced arrangement of change levers, the main change lever, which is constantly operated during the running of vehicle, is disposed at a location where an operator on the seat can operate the lever easily, whereas the auxiliary change lever, which is seldom operated during the running of vehicle, is disposed at a location where the operator is hard to operate the lever. Thus, an error in operating the change levers is seldom caused.

For a dust- and water-proof purpose, it is preferred that the support member is composed of a cover member (70) which surrounds the first and second control shafts (61, 67), lower portions of the main and auxiliary change levers (74, 75) and connecting members (80, 87) between the first and second control shafts and the main and auxiliary change levers. An opening (70b) is formed in the cover member for assembling the connecting members and is closed by a closure member (70c) secured to the cover member. The cover member achieves a dust- and water proof structure at a low cost. Additionally, grease may be coated between the change levers and control shafts for enhancing lubrication therebetween.

BRIEF DESCRIPTION OF THE DRAWINGS

The present invention and its attendant advantages will become more readily apparent as the specification is considered in conjunction with the accompanying drawings in which.

DESCRIPTION OF A PREFERRED EMBODIMENT

Figure 1:
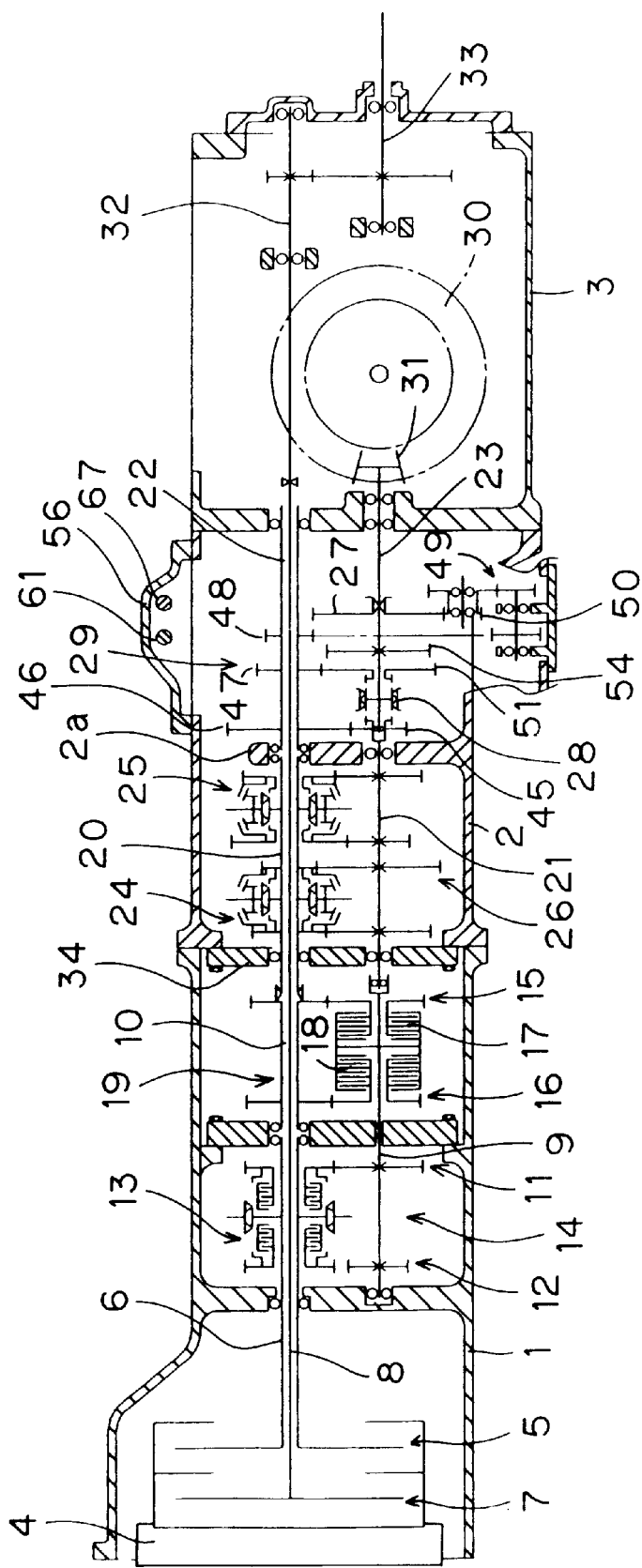
FIG. 1 is a schematic sectional side view of a tractor in which an embodiment of the present invention is employed.

FIG. 1 depicts the transmission mechanism of a tractor in which a preferred embodiment of the present invention is employed. The vehicle body of the tractor is composed of a front housing 1, an intermediate housing 2 and a rear housing 3 which are arranged in series in a longitudinal direction of the tractor and are fastened together. There are provided a hollow primary drive shaft 6 of the vehicle drive line, which is connected to an engine flywheel 4 through a main clutch 5 for the vehicle drive line, and another primary drive shaft 8 which is connected to the flywheel through another main clutch 7 for the PTO (power take-off) drive line.

Within the front housing 1, there are provided, other than the primary drive shaft 6, a transmission shaft 9, which is arranged in parallel to the primary drive shaft 6, and a hollow driven shaft 10 which is arranged coaxially with and behind the primary drive shaft 6. A direction-reversing mechanism 14 is disposed between the primary drive shaft 6 and the transmission shaft 9 and comprises a forward direction gear train 11 and a backward direction gear train 12 which are actuated selectively by a double-acting synchronizer clutch 13 mounted on the primary drive shaft 6. A high/low speed-selecting mechanism 19 is disposed between the transmission shaft 9 and the driven shaft 10 and comprises a high speed gear train 15 and a low speed gear train 16 which are actuated selectively by a high speed fluid-operated clutch 17 and a low speed fluid-operated clutch 18 which are mounted on the transmission shaft 9.

Within the intermediate housing 2, there are provided a hollow drive shaft 20 which is arranged coaxially with the driven shaft 10 and is coupled thereto, a driven shaft 21 which is arranged coaxially with the transmission shaft 9, a hollow counter shaft 22 which is arranged coaxially with the drive shaft 20, and a propeller shaft 23 which is arranged coaxilly with the driven shaft 21. A main speed change mechanism 26 is disposed between the drive shaft 20 and the driven shaft 21 and comprises four speed change gear trains, disposed between the drive and driven shafts 20 and 21, which are actuated selectively by two double-acting synchronizer cluches 24 and 25 mounted on the drive shaft 20. An auxiliary speed change mechanism 29 is disposed between the driven shaft 21 and the propeller shaft 23 and includes speed change gear trains which are connectable between the shafts 21 and 23 through the counter shaft 22. A shift gear 27 and a clutch 28 are mounted on the propeller shaft 23 for providing four change ratios by the auxiliary speed change mechanism 29. A rear end portion of the propeller shaft 23 extends into the rear housing 3 and has a bevel pinion 31 which is meshed with an input bevel gear 30 of a differential gearing (not shown) for left and right rear wheels.

The primary drive shaft 8 of the PTO drive line extends into the rear housing 3 through the hollow primary drive shaft 6, driven shaft 10, drive shaft 20 and counter shaft 22 and is coupled to a transmission shaft 32 which is arranged within the rear housing 3 coaxially with the primary drive shaft 8. A PTO shaft 33 extends rearwardly of the rear housing 3, and the transmission shaft 32 is connected to the PTO shaft 33 through a speed-reduction gearing.

Figure 2:
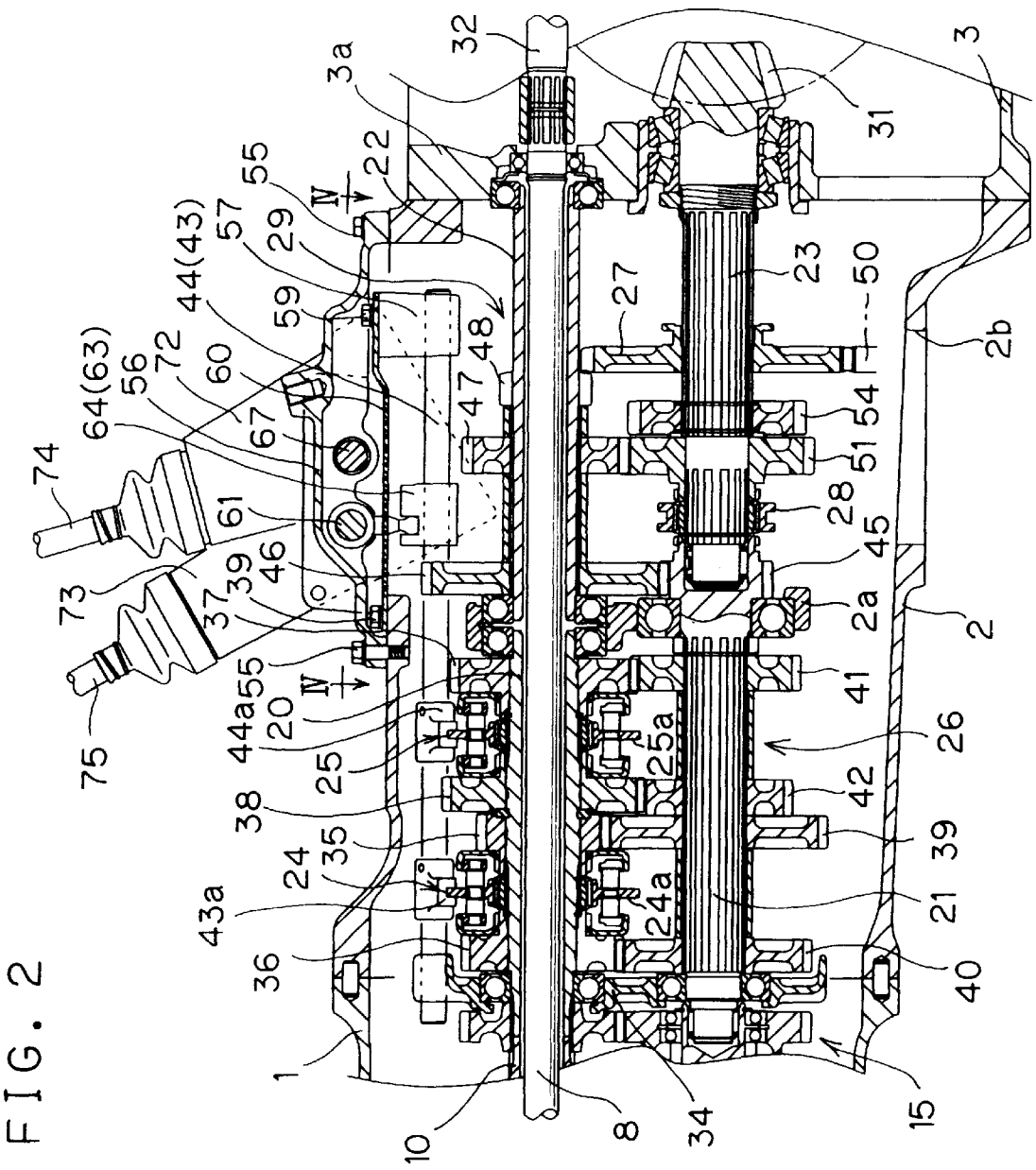
FIG. 2 is a sectional side view of an intermediate housing of the tractor.
Figure 3:
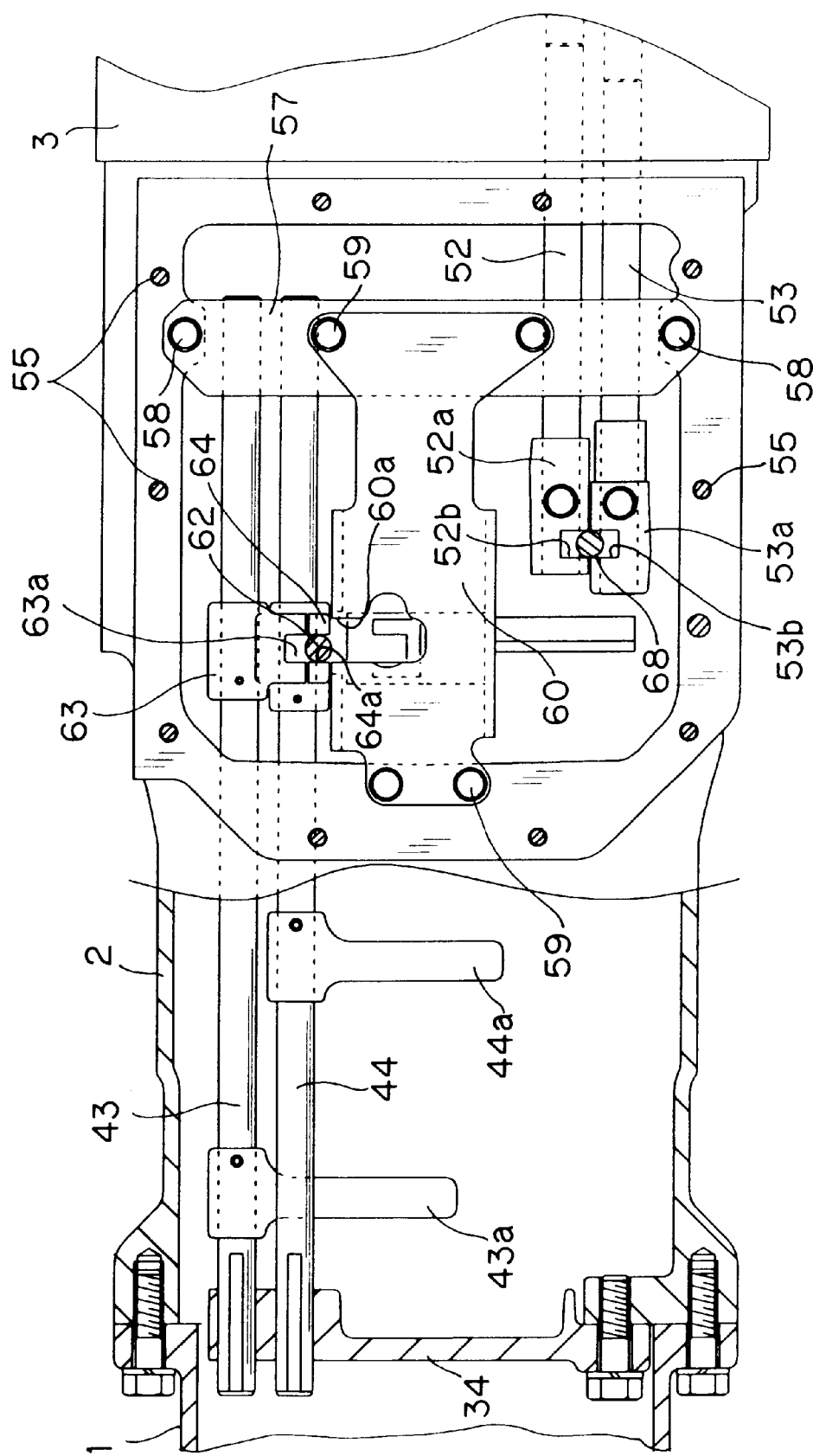
FIG. 3 is a sectional plane view of the intermediate housing.

FIG. 2 depicts the transmission mechanism in the intermediate housing 2 in great detail. A bearing support frame 34, which is secured to a front end of the intermediate housing 2, is fixedly arranged within a rear end of the front housing 1, and a support wall 2a, which is integral with the intermediate housing 2, is arranged at an intermediate portion within the intermediate housing. These support frame 34 and support wall 2a, are used for supporting the drive and driven shafts 20 and 21, and the main speed change mechanism 26 is disposed within a front half of the intermediate housing 2. The main speed change mechanism 26 comprises tour gears 35, 36, 37 and 38 which are rotatably mounted on the drive shaft 20, four gears 39, 40, 41 and 42 which are fixedly mounted on the driven shaft 21 and are meshed respectively with the gears 35–38 on the drive shaft 20 so as to provide four speed change gear trains, and the above-referenced double-acting synchronizer clutches 24 and 25 which are operable selectively so as to couple the gears 35, 36, 37 and 38 one at a time to the drive shaft 20. First to fourth change ratios can be obtained by the selective coupling of gears 35, 36, 37 and 38. For engaging the double-acting synchronizer clutches 24 and 25, shift forks 43a and 44a, which are engaged respectively with shifters 24a and 25a of the clutches 24 and 25, are fixedly secured, as shown in FIGS. 2 and 3, to fork shafts 43 and 44 which extend along the longitudinal direction of vehicle and are slidably supported.

As also shown in FIG. 2, the counter shaft 22 is supported by the support wall 2a, and by a front wall 3a of the rear housing 3 and the propeller shaft 23 is supported by a support bore formed in a rear end of the driven shaft 21 and by the front wall 3a. And, the auxiliary speed change mechanism 29 is disposed within a rear half of the intermediate housing 2. The counter shaft 22 is connected to the driven shaft 21 through a reduction gearing composed of gears 45 and 46, and two gears 47 and 48 are fixedly mounted on the counter shaft 22. As shown in FIG. 1, a gear 50, which is connected to the gear 48 through a reduction gearing 49, is provided within the intermediate housing 2 by inserting the gear 50 together with the reduction gearing 49 into the intermediate housing 2 through a bore (not shown) in a side wall of this intermediate housing. The shift gear 27 is adapted to be meshed selectively with the gear 50 and with the gear 48. A gear 51, which is meshed with the gear 47, is rotatably mounted on the propeller shaft 23, and the clutch 28 is adapted to be displaced selectively to a position, where it couples the gear 51 to the propeller shaft 23, and another position where it couples the propeller shaft 23 directly to the driven shaft 21. The auxiliary speed change mechanism 29 provides selectively a creep change ratio when the shift gear 27 is meshed with the gear 50, a first speed ratio when the shift gear 27 is meshed with the gear 48, a second speed ratio when the gear 51 is coupled to the propeller shaft 23 by the clutch 28, and a third speed ratio when the propeller shaft 23 is coupled directly to the driven shaft 21 by the clutch 28. For selectively displacing the shift gear 27 and the clutch 28, shift forks 52a and 53a, which are engaged respectively with the shift gear 27 and the clutch 28, are slidably mounted as shown in FIG. 3, on fork shafts 52 and 53 which extend along the longitudinal direction of vehicle.

As shown in FIG. 2, another gear 54 is fixedly mounted on the propeller shaft 23 and is used for selectively taking-off front weel-driving power from the propeller shaft 23. A bottom wall of the intermediate housing 2 is provided with an opening 2b for taking-off the front wheel-driving power. The gear 54 is also adapted to be selectively locked by a parking brake so as to brake the propeller shaft 23.

Figure 4:
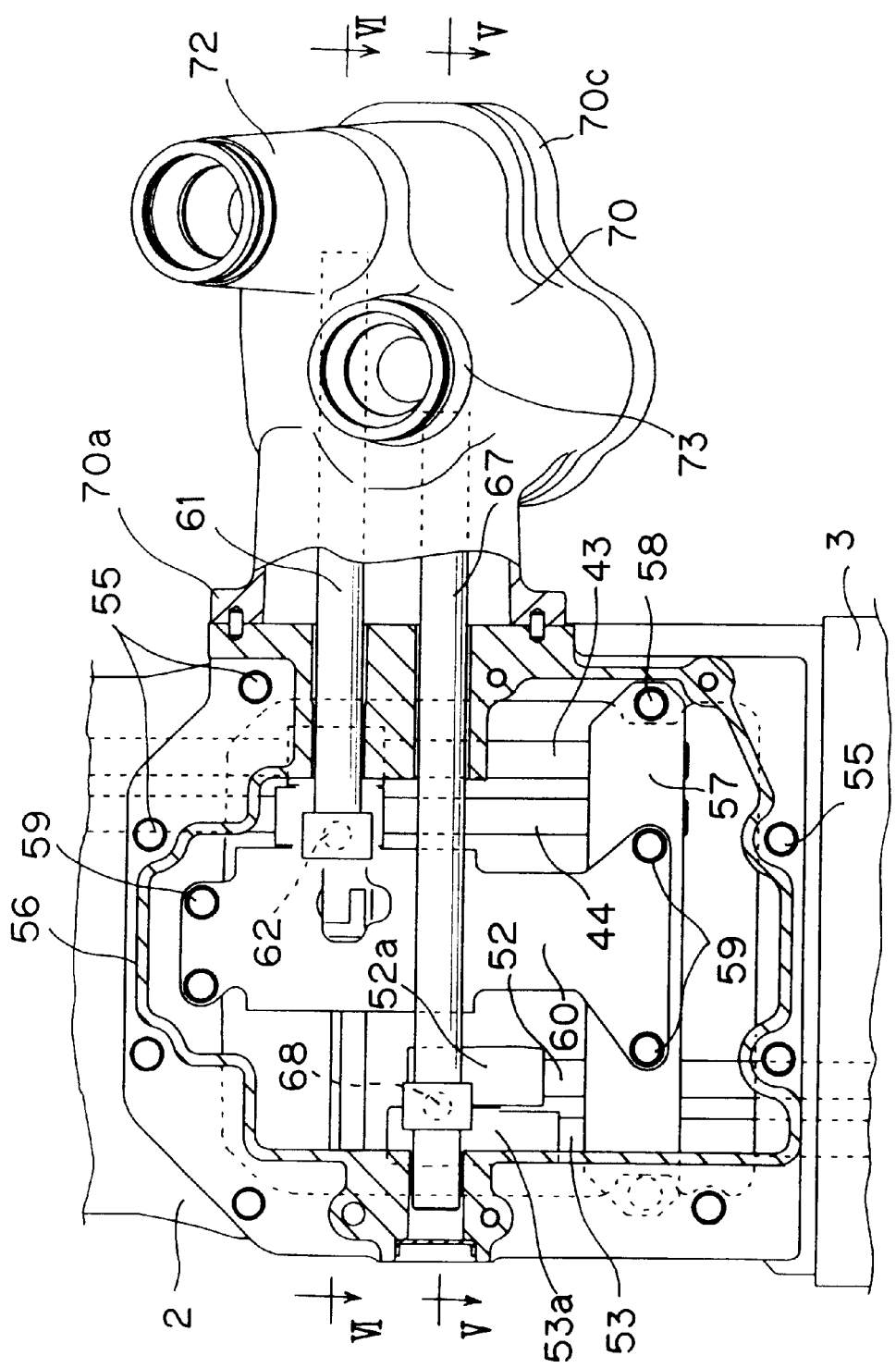
FIG. 4 is an enlarged sectional plane view taken generally along line IV—IV of FIG. 2.

As shown in FIG. 2, an upper wall of the intermediate housing 2 is provided, at a rear half thereof, an opening which is closed by a cover plate 56 secured to the upper wall using bolts 55. FIG. 3 is a sectional plane view of the intermediate housing 2 in a condition where the cover plate 56 is removed, and FIG. 4 is a sectional plane view of the intermediate housing 2 taken along line IV—IV of FIG. 2. As shown in FIGS. 2 to 4, there are provided within the cover plate 56 a support plate 57, which extends laterally of the intermediate housing 2 and is secured to an upper surface thereof using bolts 58, and a guide frame 60 which extends longitudinally of the intermediate housing 2 and is secured to an upper surface of the intermediate housing and to the support plate 57 using bolts 59. The fork shafts 43 and 44 for the main speed change mechanism 26 are supported by the bearing support wall 34 and by the support plate 57, and the fork shafts 52 and 53 for the auxiliary speed change mechanism 29 are supported by the support plate 57 and by a rear wall of the intermediate housing 2.

Figure 5:
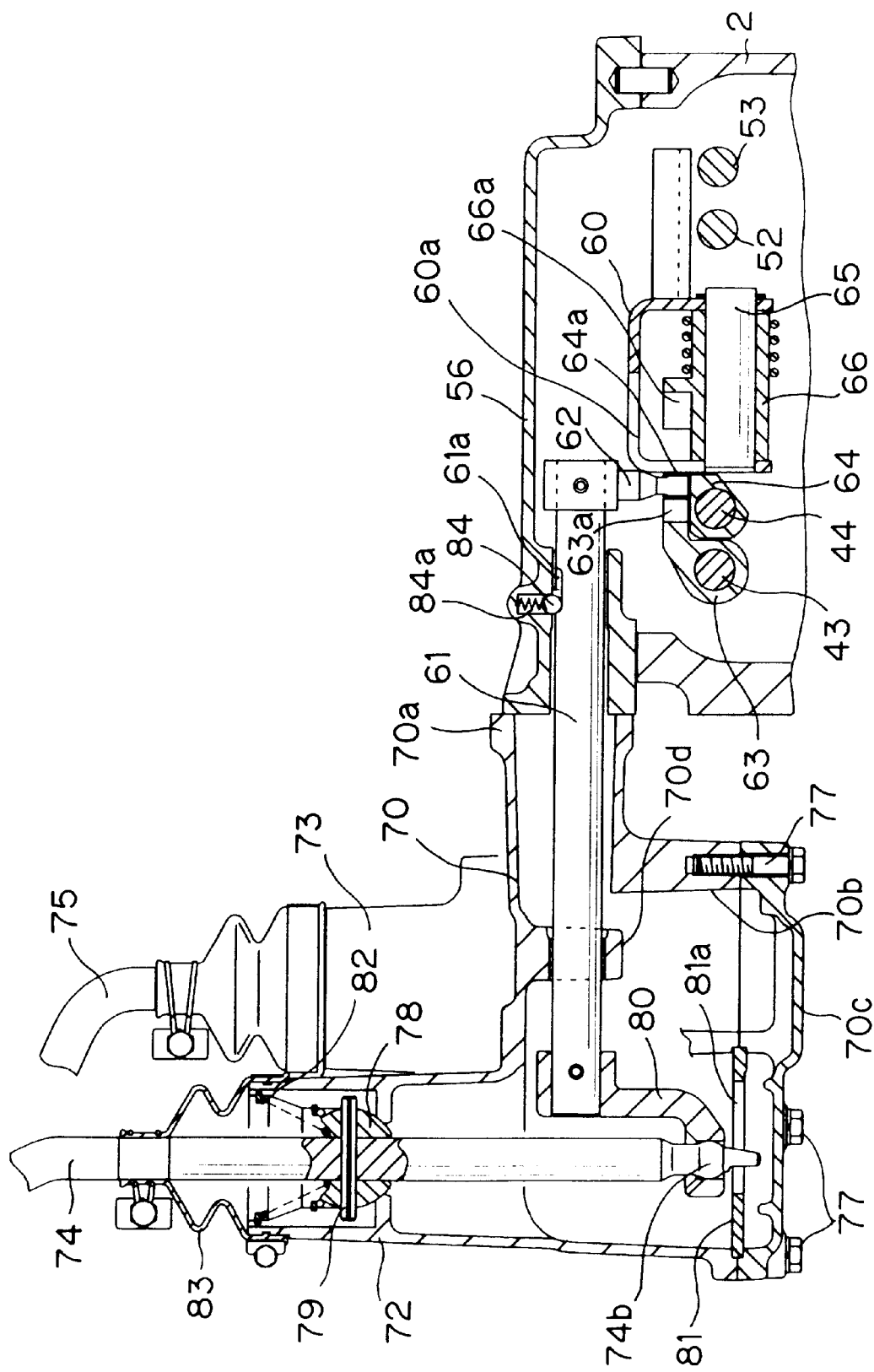
FIG. 5 is a sectional front view taken generally along line V—V of FIG. 4.
Figure 6:
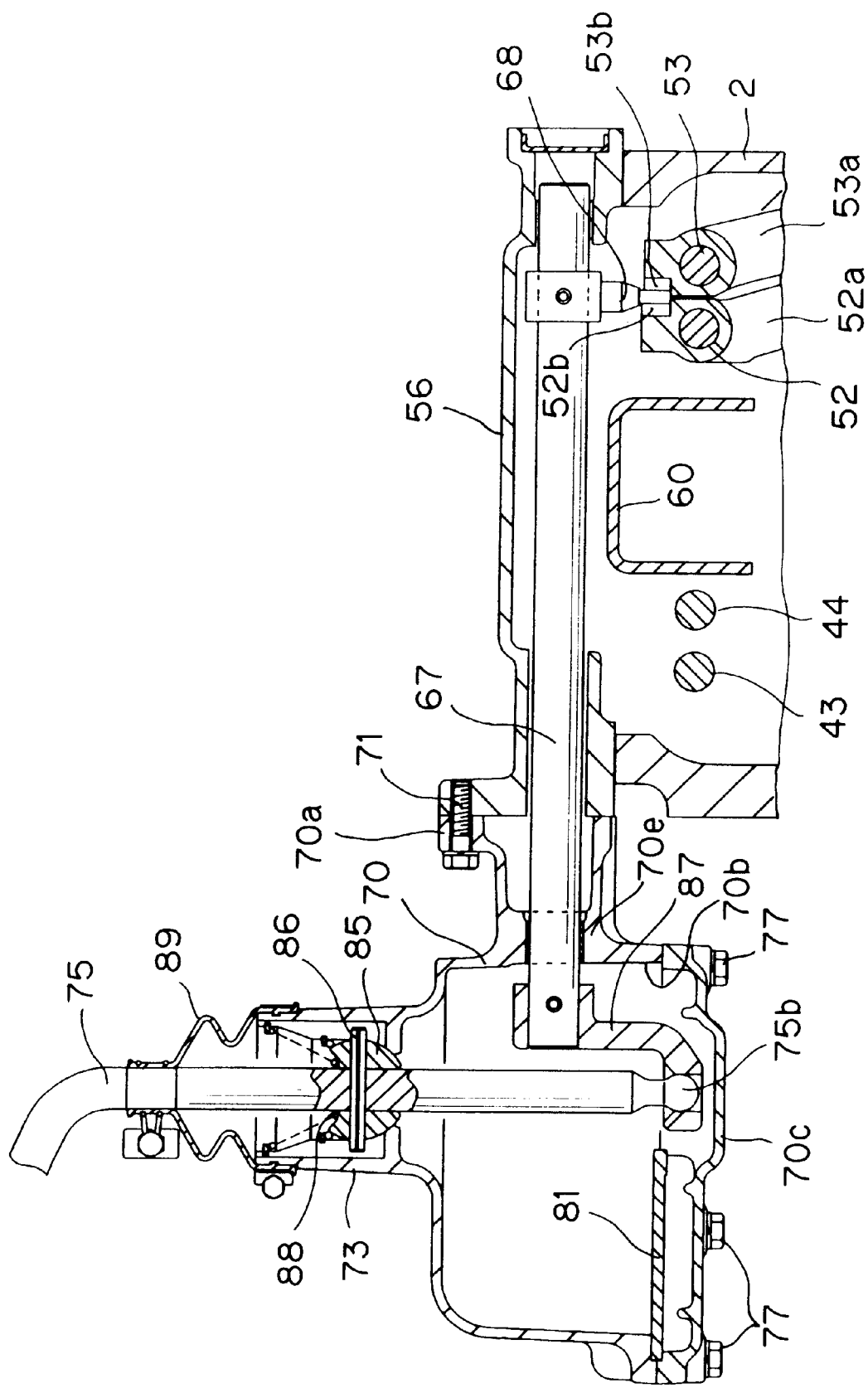
FIG. 6 is a sectional front view taken generally along line VI—VI of FIG. 4.

FIGS. 5 and 6 are cross-sectional front views taken respectively along line V—V and line VI—VI of FIG. 4. As shown in FIGS. 2 to 5, a first control shaft 61 extends laterally of the intermediate housing 2 through a side wall of the cover plate 56 and is slidably and rotatably supported by the side wall. An inner end of the control shaft 61 has an operating pin 62 secured thereto, and operating members 63 and 64 are fixedly mounted on the fork shafts 43 and 44 for the main change mechanism 26. The operating members 63 and 64 have recesses 63a and 64a, respectively, which are faced to the operating pin 62 such that the pin 62 can be placed in the recess 63a or 64a by a selective sliding displacement of the first control shaft 61 so as to engage the pin 62 with the operating member 63 or 64. Thereafter, by a selective rotational displacement of the control shaft 61 into one or the other direction, the fork shaft 43 or 44 can be slidingly displaced into one or the other direction, so that the double-acting synchronizer clutches 24 and 25 can be engaged.

In the embodiment shown, the first control shaft 61 is also used for locking the above-referenced gear 54 on the propeller shaft 23. As clearly shown in FIG. 5, an operating member 66, which is mounted on a support shaft 65, is rotatably supported by the upside-down C-shaped guide frame 60. A recess 66a, which is faced to the operating pin 62, is formed in an integral projection on the operationg member 66, and an opening 60a for allowing the pin 62 to pass is formed in the guide frame 60 so that the pin 62 can be placed in the recess 66a so as to engage the pin with the operating member 66 by a selective sliding displacement of the first control shaft 61. The operating member 66 is operatively connected to a rotatable locking pawl (not shown) for locking the gear 54, so that the gear 54 can be locked by a selective rotational displacement of the first control shaft 61 in a condition where the pin 62 engages the operating member 66. The locking pawl and the connecting mechanism between the operating member 66 and the locking pawl are described in great detail in the above-referenced U.S. Pat. No. 5,269,195.

As shown in FIGS. 2 to 4 and in FIG. 6, a second control shaft 67 extends laterally of the intermediate housing 2 through the above-referenced side wall of cover plate 56 and is slidably and rotatably supported by the side wall, as is the case of the first control shaft 61. An inner end of the second control shaft 67 has an operating pin 68 secured thereto. Upper ends of the shift forks 52a and 53a for the auxiliary speed change mechanism 29 have recesses 52b and 53b, respectively, which are faced to the operating pin 68 such that the pin 68 can be placed in the recess 52b or 53b by a selective sliding displacement of the second control shaft 67 so as to engage the pin 68 with the shift fork 52a or 53a. Thereafter, by a selective rotational displacement of the second control shaft 67 into one or the other direction, the shift fork 52a or 53a can be slidingly displaced into one or the other direction, so that the shift gear 27 and the clutch 28 can be slidingly displaced as required.

Figure 7:
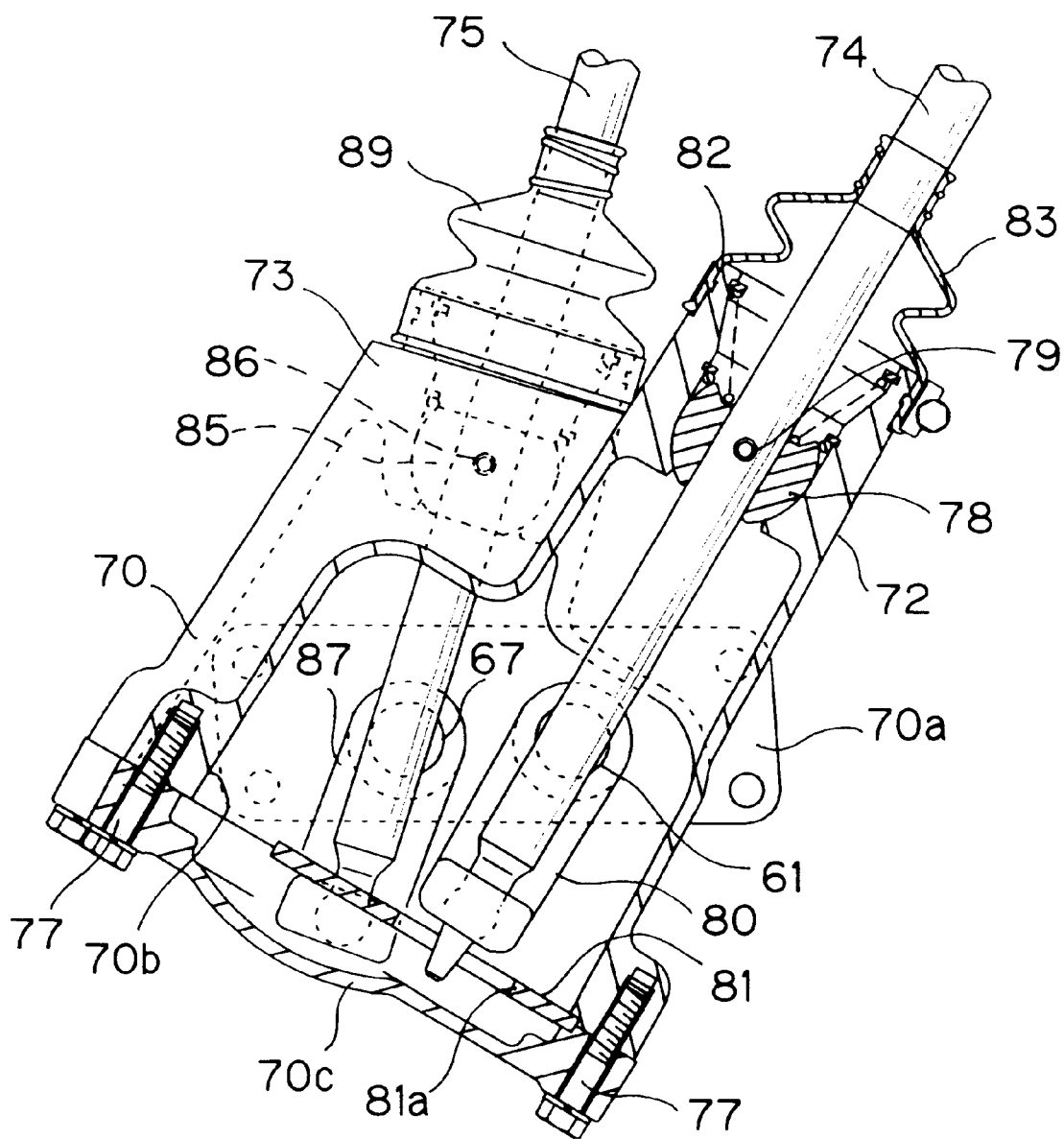
FIG. 7 is a sectional side view of a cover member employed in the tractor.
Figure 8:
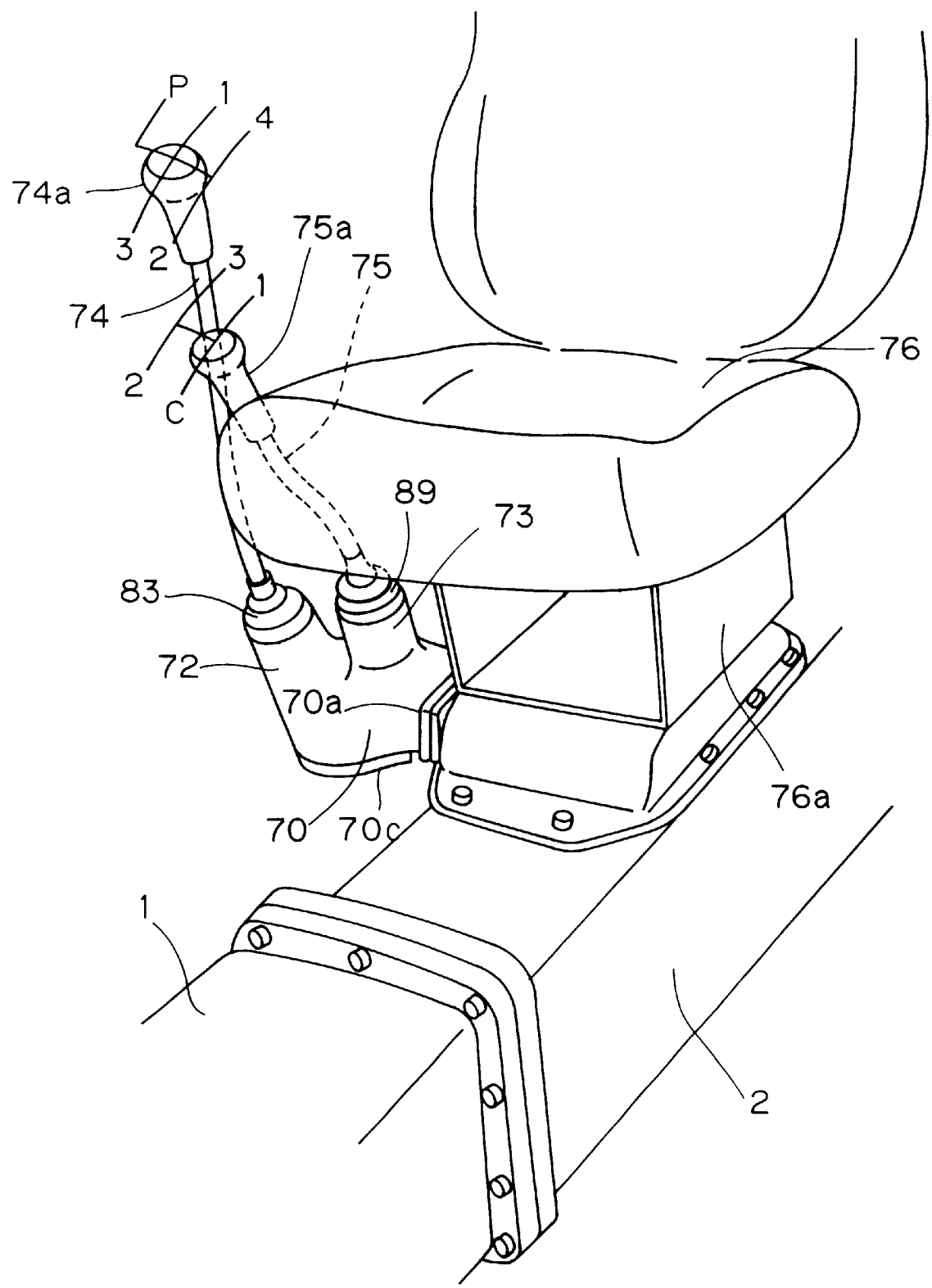
FIG. 8 is a schematic perspective view showing a part of the tractor.

As shown in FIGS. 4 to 8, a cover member 70 is fixedly secured at an attaching flange 70a thereof to the side wall of cover plate 56 using bolts 71. The cover member 70 includes upstanding cylindrical first and second lever-supporting portions 72 and 73 each of which is inclined slightly toward the outside. A main change lever 74 is pivotally supported by the first lever-supporting portion 72, and an auxiliary change lever 75 is pivotally supported by the second lever-supporting portion 73. As shown in FIG. 8, the change levers 74 and 75 are disposed at a front portion of one side of a seat 76, which is mounted on the intermediate housing 2 through a support base 76a, such that the main change lever 74 is located outwardly of the auxiliary change lever 75 and such that a grip portion 74a of the main change lever 74 is located at a higher level than a grip portion 75a of the auxiliary change lever 75. As can be seen from FIGS. 7 and 8, the cover member 70 is case-shaped and an lower end thereof includes an opening 70b which is closed by a closure member 70c secured to the cover member using bolts 77.

As shown in FIGS. 5 and 7, the main change lever 74 is connected to a ball 78, which is received by a seat formed in the lever-supporting portion 72 at an inside surface thereof, by a pin 79 which extends parallel to the first control shaft 61. An arm 80, which extends toward a lower end of the main change lever 74, is fixedly secured to the first control shaft 61, and the main change lever 74 is connected to the first control shaft 61 by receiving a ball portion 74b formed in the change lever 74 near a lower end thereof in a bore formed in the arm 80. Accordingly, the first control shaft 61 is slidingly displaced when the main change lever 74 is operated to be displaced along a direction across the vehicle whereas the first control shaft 61 is rotationally displaced when the main change lever 74 is operated to be displaced along a longitudinal direction of the vehicle. First speed position 1, second speed position 2, third speed position 3, fourth speed position 4 and parking position P (where the gear 54 is locked) of the main speed change mechanism 26 by means of the main change lever 74 are settled as shown in FIG. 8. The lower end of main change lever 74 is guided by a bore 80a, which includes similar first to fourth speed and parking positions, of a guide plate 80. The guide plate 80 is secured within the cover member 70 together with the closure member 70c.

As shown in FIGS. 5 and 7, the main change lever 74 is biased to move to its neutral position by a spring 82 acting upon an upper surface of the ball 78. A flexible cover or boot 83 is retained by the change lever 74 and by the lever-supporting portion 72 for preventing dust and rain water from entering the lever-supporting portion 72. A guide projection 70d is formed in an inner surface of the cover member 70 for also supporting the first control shaft 61. The first control shaft 61 has a recess 61a which extends longitudinally of the control shaft by a predetermined length, and a ball 84, which can enter the recess 61a by the biasing force of a spring 84a, is retained by the cover plate 56. The range of the recess 61a is predetermined such that the ball 84 enters the recess 61a when the first control shaft 61 is positioned in a sliding range where the operating pin 62 can engage the operating members 63 and 64, but such that the ball 84 becomes out of the recess 61a when the first control shaft 61 is slidingly displaced to a position where the operating pin 62 is engageable with the operating member 66. Thus, the resistance against the sliding movement of first control shaft 61 is increased when the control shaft 61 is slidingly displaced to its parking position, so that an operator can catch the operation to the parking position from a sudden increase in the operation resistance of the main change lever 74.

As shown in FIGS. 6 and 7, the auxiliary change lever 75 is connected to a ball 85, which is received by a seat formed in the lever-supporting portion 73 at an inside surface thereof, by a pin 86 which extends parallel to the second control shaft 67. An arm 87, which extends toward a lower end of the auxiliary change lever 75, is fixedly secured to the second control shaft 67, and the auxiliary change lever 75 is connected to the second control shaft 67 at a location outside the guide plate 81 by receiving a ball portion 75b formed at a lower end of the change lever 75 in a bore formed in the arm 87. Accordingly, the second control shaft 67 is slidingly displaced when the auxiliary change lever 75 is operated to be displaced along a direction across the vehicle whereas the second control shaft 67 is rotationally displaced when the auxiliary change lever 75 is operated to be displaced along a longitudinal direction of the vehicle. Creep position C, first speed position 1, second speed position 2 and third speed position 3 of the auxiliary speed change mechanism 29 by means of the auxiliary change lever 75 are settled as shown in FIG. 8. The auxiliary change lever 75 is also biased to move to its neutral position by a spring 88 acting upon an upper surface of the ball 85. A flexible cover or boot 89 is retained by the change lever 75 and by the lever-supporting portion 73 for preventing dust and rain water from entering the lever-supporting portion 73. A tubular guide portion 70e is formed in the cover member 70 for also supporting the second control shaft 67.

The speed change control device shown is assembled in a manner such that the cover member 70, to which the main and auxiliary change levers 74 and 75 have been assembled in advance, is placed onto one side wall of the cover plate 56 with the projection 70d and tubular portion 70e being fitted onto the first and second control shafts 61 and 67 and is secured to the side wall using bolts 71. Then, the arms 80 and 87 are inserted into the cover member 70 through the bottom. opening 70b thereof for connecting between the first control shaft 61 and the main change lever 74 and between the second control shaft 67 and the auxiliary change lever 75. Grease is coated between the balls 78 and 85 and the seats therefor, between the change levers 74 and 75 and the arms 80 and 87 and between the control shafts 61 and 67 and the projection 70d and tubular portion 70e. Then, the guide plate 81 is assembled and the cover plate 70c is secured to the lower end of cover member 70 using bolts 77 so as to fasten the guide plate 81 and cover plate 70c together.

Although the opening 70b for assembling the connecting members or arms 80 and 87 between the control shafts 61 and 67 and the change levers 74 and 75 are provided at a lower end of the cover member 70, such an opening may be provided at another portion of the cover member 70, for example, at a side wall thereof. Further, although the cover member 70 is shown which surrounds the first and second control shafts 61 and 67, the lower portions of change levers 74 and 75, and the connecting members or arms 80 and 87 and which is useful for dust- and water-proof purpose, the present invention is not limited to the use of such a cover member and a support member for only supporting the main and auxiliary change levers 74 and 75 pivotally may be provided in place of the cover member 70.

Because the change levers 74 and 75 are disposed at one side of the seat 76, as shown in FIG. 8, such that the main change lever 74 is located outwardly of the auxiliary change lever 75 and such that the grip portion 74a of main change lever 74 is located at a higher level than the grip portion 75a of auxiliary change lever 75, the main change lever 74 is disposed at a location where it can be operated easily by an operator on the seat 76 whereas the auxiliary change lever 75 is disposed at a location where it is hard for the operator to operate. The auxiliary speed change mechanism 29 is used such that a suitable change ratio thereof is preset prior to the running of vehicle in response to the running condition, whereas the main speed change mechanism 26 is used such that it is constantly operated during the running of vehicle. Thus, the main and auxiliary change levers 74 and 75 are disposed respectively in accordance of their use and an error in operating the change levers 74 and 75 is seldom caused.

We claim:

1. In a tractor having a main speed change mechanism (26) and an auxiliary speed change mechanism (29) which are disposed in a vehicle housing (2), a speed change control device characterized in:

that said vehicle housing (2) has an upper wall with an opening formed therein and a cover plate (56) is removably secured to said upper wall so as to close said opening;

that fork shafts (43, 44) for shifting said main speed change mechanism and fork shafts (52, 53) for shifting said auxiliary speed change mechanism are provided facing said opening;

that a first control shaft (61) and a second control shaft (67) are engaged with said fork shafts through said opening, extend laterally with respect to a seat (76) on said vehicle housing (2), and are displaced to each other in the longitudinal direction of the vehicle, while being supported by said cover plate so as to be slidingly and rotationally displaceable and projecting outwardly to one side of said cover plate; and that a main change lever (74) and an auxiliary change lever (75) are displaced to each other in the longitudinal direction of the vehicle, while being supported by a common support member (70), which is fixedly provided at said one side of said cover plate, in such a manner as to each be independently pivotable in two directions crossing each other, said first and second control shafts (61, 67) being connected respectively to said main and auxiliary change levers such that each of said first and second control shafts is selectively displaced slidingly and rotationally by a selective pivotal operation of each of said main and auxiliary change levers.

2. The speed change control device as set forth in claim 1, wherein said main change lever (74) and said auxiliary change lever (75) are disposed at one side of a seat (76) on said vehicle housing (2) such that said main change lever is located outwardly of said auxiliary change lever and such that a grip portion (74a) of said man change lever is located at a higher level than a grip portion (75a) of said auxiliary change lever.

3. The speed change control device as set forth in claim 1, wherein said support member is composed of a cover member (70) which surrounds said first and second control shafts (61, 67), lower portions of said main and auxiliary change levers (74, 75) and connecting members (80, 87) between said first and second control shafts and said main and auxiliary change levers, an opening (70*b*) formed in said cover member for assembling said connecting members being closed by a closure member (70*c*) secured to said cover member.

4. In a tractor having a main speed change mechanism (26) and an auxiliary speed change mechanism (29) which are disposed in a vehicle housing (2), a speed change control device characterized in:

that a slidingly and rotationally displaceable first control shaft (61) for shifting said main speed change mechanism and a slidingly and rotationally displaceable second control shaft (67) for shifting said auxiliary speed change mechanism (29) laterally extend with respect to a seat on said vehicle housing and project outwardly to one side of said vehicle housing, while being displaced to each other in the longitudinal direction of the vehicle;

that a main change lever (74) and an auxiliary change lever (75) are displaced to each other in the longitudinal direction of the vehicle, while being supported by a common support member (70), which is fixedly provided at said one side of said vehicle housing, in such a manner as to each be independently pivotable in two directions crossing each other, said first and second control shafts (61, 67) being connected respectively to said main and auxiliary change levers such that each of said first and second control shafts is selectively displaced slidingly and rotationally by a selective pivotal operation of each of said main and auxiliary change levers.

5. The speed change control device as set forth in claim 4, wherein said main change lever (74) and said auxiliary change lever (75) are disposed at one side of a seat (76) on said vehicle housing (2) such that said main change lever is located outwardly of said auxiliary change lever and such that a grip portion (74*a*) of said main change lever is located at a higher level than a grip portion (75*a*) of said auxiliary change lever.

6. The speed change control device as set forth in claim 4, wherein said support member is composed of a cover member (70) which surrounds said first and second control shafts (61, 67), lower portions of said main and auxiliary change levers (74, 75) and connecting members (80, 87) between said first and second control shafts and said main and auxiliary change levers, an opening (70*b*) formed in said cover member for assembling said connecting members being closed by a closure member (70*c*) secured to said cover member.

* * * * *